United States Patent
Coon et al.

(10) Patent No.: US 6,268,981 B1
(45) Date of Patent: Jul. 31, 2001

(54) WIRELESS SUSPENSION WITH TWO-SIDED ENCLOSURE OF CONDUCTIVE TRACES

(75) Inventors: Warren Coon; Amanullah Khan, both of Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/385,920

(22) Filed: Aug. 30, 1999

Related U.S. Application Data

(60) Provisional application No. 60/133,623, filed on May 11, 1999.

(51) Int. Cl.[7] .............................. G11B 5/48; G11B 21/16
(52) U.S. Cl. ...................................... 360/244.3; 360/245.9
(58) Field of Search ............................ 360/244.3, 244.2, 360/245.8, 245.9, 246, FOR 204

(56) References Cited

U.S. PATENT DOCUMENTS

| | | | |
|---|---|---|---|
| 4,819,094 | * 4/1989 | Oberg | 360/245.9 |
| 5,245,489 | * 9/1993 | Kimura et al. | 360/264.2 |
| 5,680,274 | * 10/1997 | Palmer | 360/245.9 |
| 5,883,758 | * 3/1999 | Bennin et al. | 360/245.9 |
| 5,894,655 | * 4/1999 | Symons | 29/603.03 |

* cited by examiner

Primary Examiner—Robert S. Tupper
Assistant Examiner—Julie Anne Watko
(74) Attorney, Agent, or Firm—Louis J. Bachand

(57) ABSTRACT

A disk drive suspension has increased protection against signal loss and mechanical damage and increased isolation from ambient electrical disturbances where the metal layer of the flexible conductive laminate is remote to the load beam rather than next to the load beam to mechanically and electrically protect the conductive traces of the laminate on two sides against signal loss and mechanical damage and have increased isolation from ambient electrical disturbances.

22 Claims, 3 Drawing Sheets

WIRELESS SUSPENSION WITH TWO-SIDED ENCLOSURE OF CONDUCTIVE TRACES

REFERENCE TO RELATED APPLICATIONS

This application claims the benefit of U.S. Provisional Application Serial No. 60/133,623 filed May 11, 1999.

BACKGROUND OF THE INVENTION

1. Field of the Invention

This invention relates to disk drive suspensions, and more particularly to wireless disk drive suspension assemblies having conductive traces enclosed on both sides with electrically and mechanically shielding metal layers including the load beam on one side and the wireless conductor metal layer on the second side.

2. Related Art

Wireless disk drive suspensions are referred to by various trade designations such as ILS or Integrated Lead Suspension, Trace, or CAPS. While somewhat differently manufactured, e.g., from an additive process in which successive layers are built up, or from a subtractive process in which selective removal of layers gives the desired structure: a flexible conductive laminate structure, all these devices involve a metal or base layer that may be used to define the suspension flexure, a plastic layer that contains, insulates and protects a layer comprised of conductive traces of deposited copper metal, and usually a cover layer of insulative plastic. As set forth below, there is a trend in suspension devices toward smaller signal amplitudes being available and thus ambient electrical noise becomes a greater factor. There is a need to further improve wireless suspensions to minimize the effect of electrical disturbances.

SUMMARY OF THE INVENTION

It is an object of the invention, therefore, to provide an improved wireless suspension. It is a further object to provide electrical and mechanical protection to the delicate traces in a wireless suspension. Another object of the invention is to invert the normal orientation of the flexible conductive laminate on the load beam so that the metal layer is outermost and not next to the load beam and provides both electrical shielding and mechanical protection to the conductive traces. Other objects include supporting the flexible conductive laminate by tab structures extending from the metal layer to the load beam, recessing the load beam to accommodate the non-metal portions of the flexible circuit laminate, and adding a visco-elastic damping material to the load beam/flexible conductive laminate combination of the invention.

These and other objects of the invention to become apparent hereinafter, are realized in a disk drive suspension having increased protection against signal loss and mechanical damage and increased isolation from ambient electrical disturbances, the suspension comprising a metal load beam and a flexible conductive laminate comprising a metal layer and a plastic layer comprising an insulating film having a plurality of conductive traces therein, the plastic layer being sandwiched between the metal load beam and the conductive laminate metal layer in metal load beam and metal layer spacing relation, the conductive laminate metal layer being electrically connected to the load beam, whereby the conductive traces are protected on two sides against signal loss and mechanical damage and have increased isolation from ambient electrical disturbances.

In this and like embodiments, typically, the flexible conductive laminate metal layer defines a tab extending to the metal load beam and attached thereto in mechanically supporting and electrically conducting relation, the flexible conductive metal layer defines a pair of opposed tabs on opposite sides of the metal layer, the tabs extending generally normal to the metal layer and having terminals extending in parallel with the load beam, the metal layer being attached to the load beam by the tabs, the tab terminals extend in the plane of the plastic layer, the load beam defines a channel sized and shaped to receive the flexible conductive laminate plastic layer opposite the load beam, the flexible conductive metal layer defines a pair of opposed tabs on opposite sides of the metal layer, the tabs extending in the plane of the metal layer and having terminals parallel with the load beam, and there can also be included a visco-elastic material attached to the load beam in vibration damping relation, and/or the flexible conductive laminate extends the length of the load beam to a terminus, the metal layer of the flexible conductive laminate having a projecting portion extending beyond the laminate terminus, the metal layer projecting portion defining a flexure for the suspension.

In a further embodiment, the invention provides a disk drive suspension having increased protection against signal loss and mechanical damage and increased isolation from ambient electrical disturbances, the suspension comprising a slider, a flexure supporting the slider, a metal load beam and a flexible conductive laminate comprising a metal layer and a plastic layer comprising an insulating film having a plurality of conductive traces therein, the metal layer defining the flexure, the plastic layer being sandwiched between the metal load beam and the conductive laminate metal layer in metal load beam and metal layer spacing relation, the conductive laminate metal layer being electrically connected to the load beam, whereby the conductive traces are protected on two sides against signal loss and mechanical damage and have increased isolation from ambient electrical disturbances.

In this and like embodiments, typically, the flexible conductive laminate metal layer defines a tab extending to the metal load beam and attached thereto in mechanically supporting and electrically conducting relation, the flexible conductive metal layer defines a pair of opposed tabs on opposite sides of the metal layer, the tabs being formed commonly with the metal layer and extending generally normal to the metal layer and having terminals extending in parallel with the load beam, the metal layer being attached to the load beam by the tabs, and the tab terminals are formed commonly with the metal layer and the tabs and extend in the plane of the plastic layer.

Further, the invention in this embodiment includes a visco-elastic material attached to the load beam in vibration damping relation.

Preferably, the flexible conductive laminate extends the length of the load beam to a terminus, the metal layer of the flexible conductive laminate having a projecting portion extending beyond the laminate terminus, the metal layer projecting portion defining the suspension flexure.

Additionally, in these and like embodiments, typically, the load beam can be etched to define a channel sized and shaped to receive the flexible conductive laminate plastic layer opposite the load beam, the flexible conductive laminate metal layer defines a tab extending outward from and generally in the plane of the metal layer, the tab attaching the metal layer to the load beam in mechanically supporting and electrically conducting relation, the flexible conductive metal layer defines a pair of opposed tabs on opposite sides of the metal layer, the tabs being formed commonly with the metal layer and having terminals by which the metal layer is attached to the load beam, the tab terminals are formed commonly with the metal layer and the tabs and extend in the plane of the metal layer.

In its method aspects, the invention provides a method for the assembly of disk drive suspensions including juxtaposing a load beam and flexible conductive laminate having a plastic layer comprising conductive traces in insulating plastic, and a metal layer with the metal layer, the laminate metal layer being remote to the load beam, the laminate metal layer defining a flexure for mounting a slider, and attaching the flexible conductive laminate to the load beam in mechanical and electrically connected relation, whereby the conductive traces are protected on two sides against signal loss and mechanical damage and have increased isolation from ambient electrical disturbances.

The method typically further includes defining a plurality of projecting tabs on the laminate metal layer, and attaching the metal layer to the load beam with the tabs, and in some embodiments also etching a longitudinally extended recess in the load beam in laminate plastic layer receiving relation and inserting the laminate plastic layer in the recess while maintaining the laminate metal layer above the recess.

BRIEF DESCRIPTION OF THE DRAWINGS

The invention will be further described in conjunction with the attached drawings in which.

DETAILED DESCRIPTION

Wireless suspensions are used in replacement of conventional wire and flexure arrangements. Wireless suspensions, in conjunction with a load beam, use a flexible conductive laminate of a metal layer and a plastic insulator layer that contains conductive traces. These laminate suspensions have essentially three layers (the insulating plastic overcoat is not counted), namely the metal or base layer comprising stainless steel, the plastic insulating layer, typically a polyimide dielectric, and the traces, usually copper conductors. The overcoat would be a fourth layer.

In its electric aspects, a wireless suspension is a transmission line for electrical signals going between the slider-carried read/write head and the preamplifier integrated circuit or microchip. Typically, existing wireless suspensions have a cross section that exactly matches a textbook "microstrip line" with the base layer functioning as the ground plane.

In transmission lines, one desideratum is to reduce the impact of adjacent stray fields that can introduce noise into the desired signal, and to reduce losses associated with the signal being lost, or reduced, by coupling or diverting into adjacent objects, such as nearby circuits, wires leading to other devices, or other conductive objects. The microstrip line arrangement in a suspension maintains a consistent impedance and mechanical and electric uniformity and protects against stray signals (incoming and outgoing) in the direction of the base layer, i.e., away from the disk.

But, in the direction toward the disk, this microstrip line arrangement does not protect against stray noise pickup or signal loss. As the signal levels become smaller as happens with increased disk areal density (density of recorded bits per unit area) and decreased the track width about 40 millionths of an inch or so, the amplitude gets very small. The device becomes thus more susceptible to noise, because the noise is larger relative to the increasingly smaller desired signal.

A further problem with known wireless suspensions concerns a lack of protection for the conductive traces. The conductive traces are subject to mechanical damage from foreign objects such as a loading comb that may rub against the soft cover layer and rub through it to the conductive traces. The conductive traces are so thin (typically 0.0003 inch or even less) that any damage whatever is likely to be fatal to the assembly.

Figure 1:
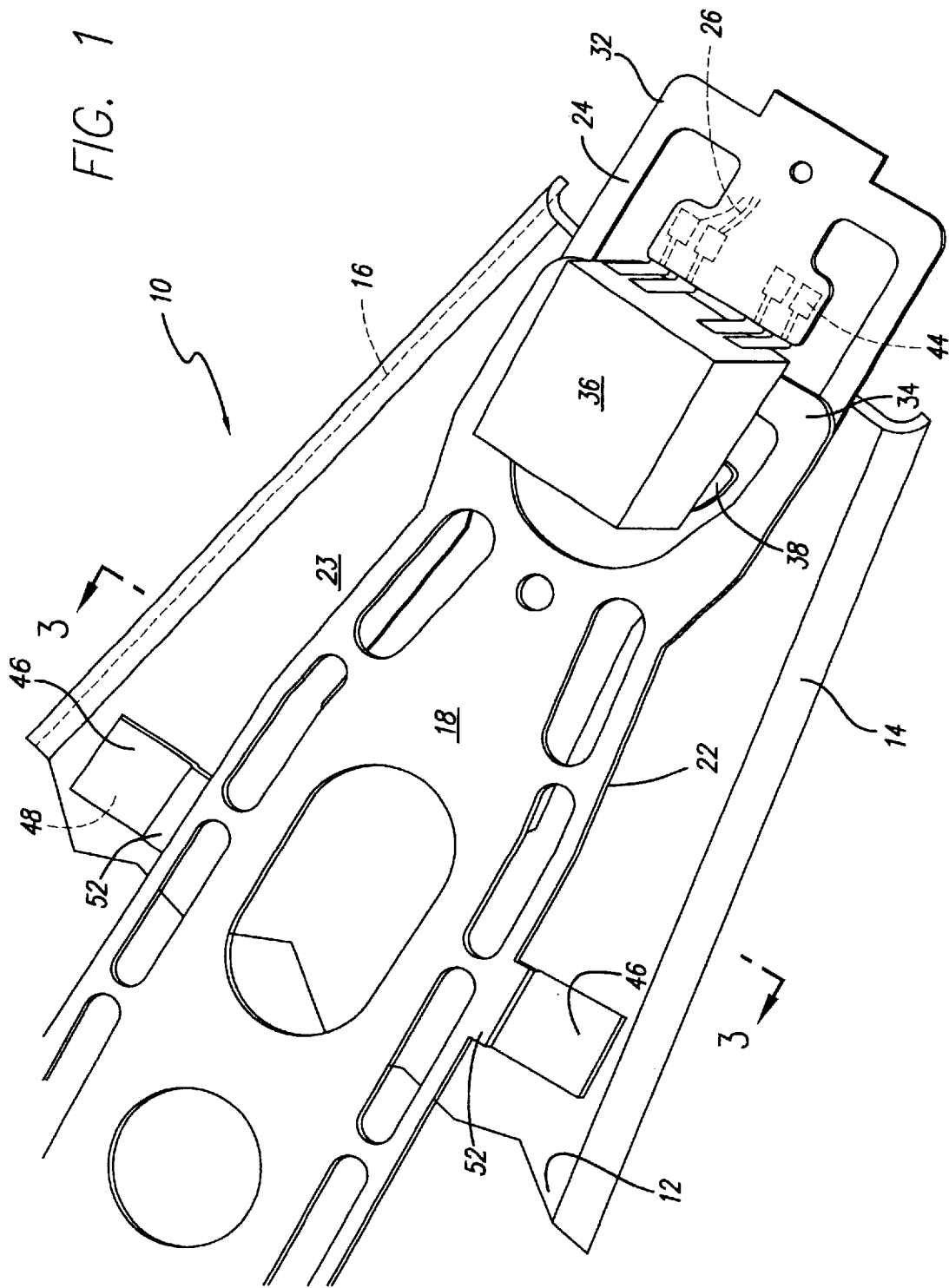
FIG. 1 is an oblique view of the invention suspension slider side up.
Figure 2:
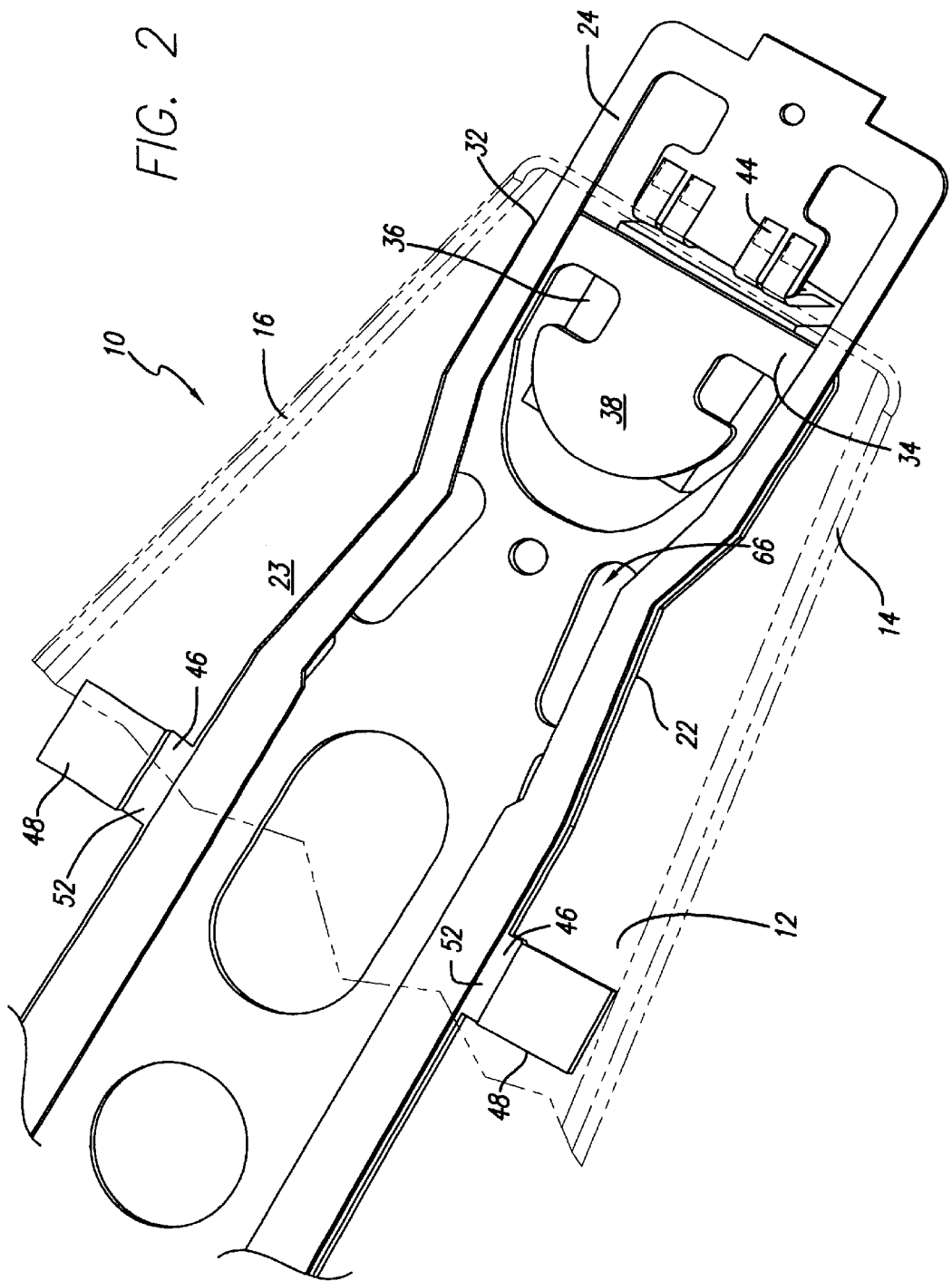
FIG. 2 is an oblique view of the suspension slider side down.
Figure 3:
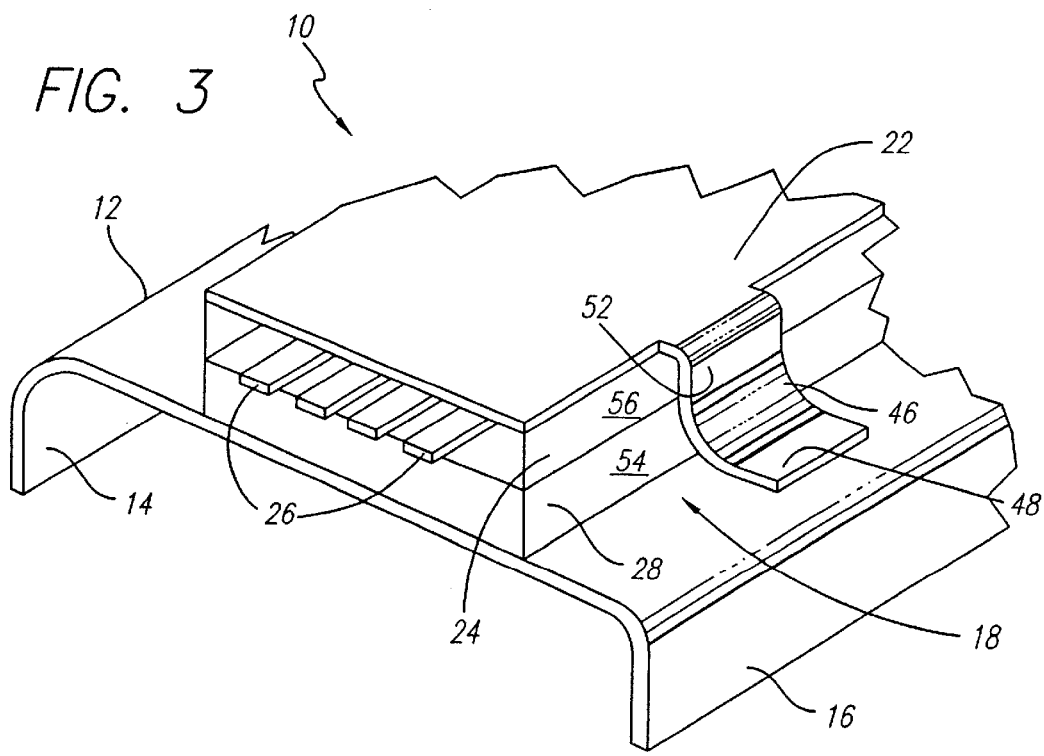
FIG. 3 is a cross-section of the suspension taken on line 3—3 in FIG. 1.

With reference now to the drawings in detail, in FIGS. 1–3 the invention suspension is shown at 10 and includes load beam 12 having right and left edge rails 14, 16. Load beam 12 is the rigid portion of a load beam having rearward of the rigid portion, and not shown, a spring portion and a base portion, the base portion being attached to an actuator arm also not shown.

Juxtaposed with the load beam 12 is a flexible conductive laminate 18. The laminate 18, known per se, comprises a metal base layer 22 and a dielectric plastic layer 24, typically a polyimide resin, a plurality of conductive traces 26, typically copper, on the plastic layer 24, and a covering layer 28 of additional dielectric plastic over the traces. Flexible conductive laminate 18 extends the length of the load beam 12 to the laminate terminus 32 where the laminate consisting of all layers terminates. Beyond laminate terminus 32 the metal layer 22 of the laminate, configured as shown, continues outward from the load beam 12 to form the flexure 34. Slider 36 containing a read-write head (not shown) is carried on the flexure tongue 38 for gimballing movement as is known. Also, the plastic layer 24 continues past the terminus 32 to carry conductive traces 26 to the slider 38 for attachment at contact pads 44 to the head.

In contrast to previously known wireless suspensions, in this invention the covering layer 28 is sandwiched between the metal load beam 12 and the conductive laminate metal layer 22, effectively spacing the load beam and metal layer. The conductive traces 26 are thus protected on two sides against signal loss and mechanical damage and have increased isolation from ambient electrical disturbances.

The metal layer 22 is both mechanically attached and electrically connected to the load beam 12 by tabs 46. Each tab 46 is formed from the metal layer 22, e.g. by etching both from a common web of stainless steel so that the tabs project laterally and then downwardly to the surface 23 of the load beam 12. Each tab 46 includes a terminal 48 formed at right angles to the tab main body 52 and parallel to the load beam surface 23. Tab main body 52 extends vertically along the edges 54, 56, respectively, of the covering layer 28 and the dielectric plastic layer 24. The tab terminals 48 are typically welded to the load beam 12 to effect the mechanical support and electrical connection of the metal layer 22 and the load beam 12.

Figure 4:
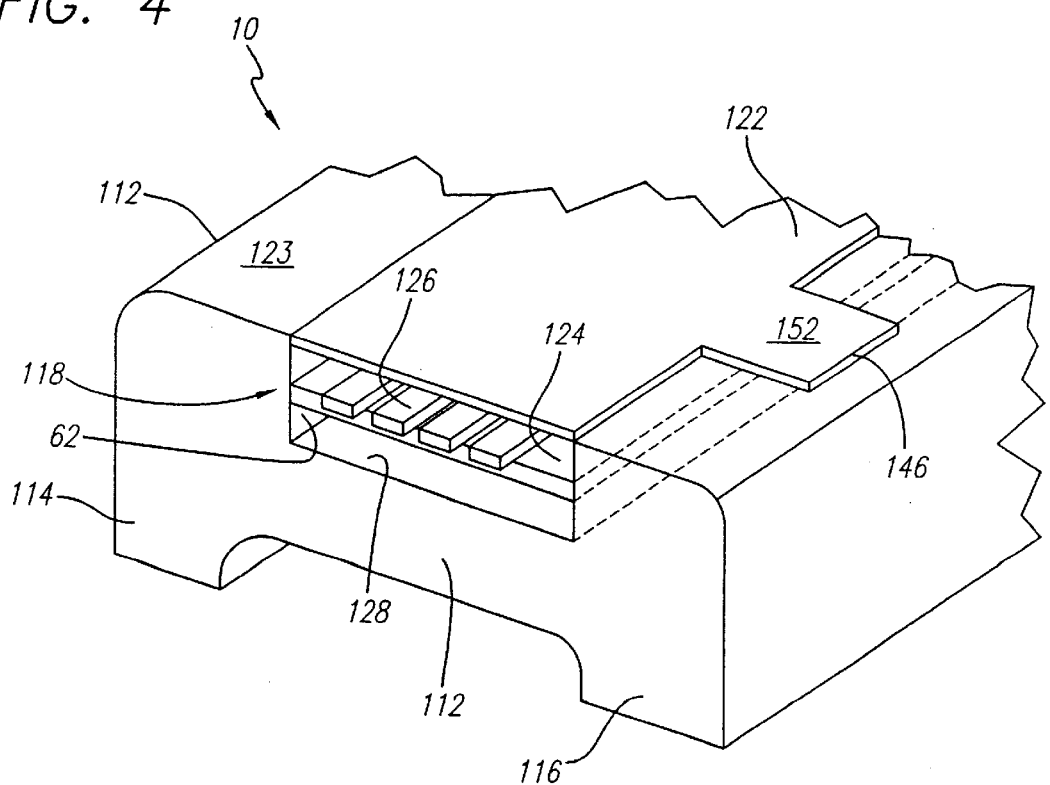
FIG. 4 is a view like FIG. 3 of an alternative embodiment.

In the alternative embodiment shown in FIG. 4, in which like parts have like numerals plus 100, the load beam 112 is partially etched along the beam surface 123 to form a recess or channel 62 of a lateral and longitudinal and depth size and shape to receive bodily the flexible conductive laminate plastic layer 124 and covering layer 128 for the bulk of their vertical height up to the location of the metal layer 122. In this embodiment, the tabs 146 extend out on opposite sides of the metal layer 122 but in the plane of the metal layer and parallel to and adjacent to the load beam surface 123.

The invention offers further advantage in its adaptability to the use of damper material. As the mechanical frequency requirements for the suspension increase, it becomes increasingly desirable to make use of damper materials, visco-elastic polymeric materials that reduce the amplitude of resonant motion. The disadvantage of dampers, beyond the piece part purchase price that can be 20% of the load beam price, is the cost of installing (mechanical registration), extra process steps for heat bonding, extra cost to maintain the required cleanliness (dampers are tacky and debris sticks to them and collects on them when exposed), and also yield losses inherent in the extra steps needed in manufacturing. The invention assembly affords the opportunity to place the damper material in a non-exposed location with precision thus avoiding prior art problems noted above. Thus, as best shown in FIG. 2, visco-elastic material 66 is attached to the load beam 12 in vibration damping relation, protected from exposure by the flexible conductive laminate 18.

The invention method for the assembly of a disk drive suspension accordingly includes juxtaposing the load beam 12 and the flexible conductive laminate 18 having a plastic layer 24 comprising conductive traces 26 in insulating plastic, and a metal layer 22, with the laminate metal layer being located remote to the load beam and forming the flexure 34 for mounting slider 36. Tabs 46 attach the flexible conductive laminate 18 to the load beam 12 in mechanical and electrically connected relation, whereby the conductive traces are protected on two sides against signal loss and mechanical damage and have increased isolation from ambient electrical disturbances. The flexible conductive laminate is disposed atop the load beam 12, or in some embodiments, placed partially within a recess or channel 62 defined in the load beam such that the plastic layer 24 (and covering layer 28 if present) is within the channel and the metal layer 22 above the load beam surface 23.

The invention thus provides a disk drive suspension having increased protection against signal loss and mechanical damage and increased isolation from ambient electrical disturbances comprising a metal load beam and a flexible conductive laminate comprising a metal layer and a plastic layer comprising an insulating film having a plurality of conductive traces therein, the plastic layer being sandwiched between the metal load beam and the conductive laminate metal layer in metal load beam and metal layer spacing relation, atop or partially within the load beam, and with or without damper material, the conductive laminate metal layer being electrically and mechanically connected to the load beam by one or more tabs. The foregoing objects are thus met.

We claim:

1. A disk drive suspension having increased protection against signal loss and mechanical damage and increased isolation from ambient electrical disturbances, said suspension comprising a metal load beam and a flexible conductive laminate comprising a metal layer and a plastic layer, said plastic layer comprising an insulating film having a plurality of conductive traces therein, said plastic layer being sandwiched between said metal load beam and said conductive laminate metal layer in metal load beam and metal layer spacing relation, said conductive laminate metal layer being electrically connected to said load beam, whereby said conductive traces are protected on two sides against signal loss and mechanical damage and have increased isolation from ambient electrical disturbances.

2. The disk drive suspension according to claim 1, in which said flexible conductive laminate metal layer defines a tab extending to said metal load beam and attached thereto in mechanically supporting and electrically conducting relation.

3. The disk drive suspension according to claim 2, in which said flexible conductive metal layer defines a pair of opposed tabs on opposite sides of said metal layer, said tabs extending generally normal to said metal layer and having terminals extending in parallel with said load beam, said metal layer being attached to said load beam by said tabs.

4. The disk drive suspension according to claim 3, in which said tab terminals extend in the plane of said plastic layer.

5. The disk drive suspension according to claim 1, in which said load beam defines a channel sized and shaped to receive said flexible conductive laminate plastic layer opposite said load beam.

6. The disk drive suspension according to claim 5, in which said flexible conductive metal layer defines a pair of opposed tabs on opposite sides of said metal layer, said tabs extending in the plane of said metal layer and having terminals parallel with said load beam.

7. The disk drive suspension according to claim 1, including also a visco-elastic material attached to said load beam in vibration damping relation.

8. The disk drive suspension according to claim 1, in which said flexible conductive laminate extends the length of said load beam to a terminus, the metal layer of said flexible conductive laminate having a projecting portion extending beyond said laminate terminus, said metal layer projecting portion defining a flexure for said suspension.

9. A disk drive suspension having increased protection against signal loss and mechanical damage and increased isolation from ambient electrical disturbances, said suspension comprising a slider, a flexure supporting said slider, a metal load beam and a flexible conductive laminate comprising a metal layer and a plastic layer, said plastic layer comprising an insulating film having a plurality of conductive traces therein, said metal layer defining said flexure, said plastic layer being sandwiched between said metal load beam and said conductive laminate metal layer in metal load beam and metal layer spacing relation, said conductive laminate metal layer being electrically connected to said load beam, whereby said conductive traces are protected on two sides against signal loss and mechanical damage and have increased isolation from ambient electrical disturbances.

10. The disk drive suspension according to claim 9, in which said flexible conductive laminate metal layer defines a tab extending to said metal load beam and attached thereto in mechanically supporting and electrically conducting relation.

11. The disk drive suspension according to claim 10, in which said flexible conductive metal layer defines a pair of opposed tabs on opposite sides of said metal layer, said tabs being formed commonly with said metal layer and extending generally normal to said metal layer and having terminals extending in parallel with said load beam, said metal layer being attached to said load beam by said tabs.

12. The disk drive suspension according to claim 11, in which said tab terminals are formed commonly with said metal layer and said tabs and extend in the plane of said plastic layer.

13. The disk drive suspension according to claim 12, including also a visco-elastic material attached to said load beam in vibration damping relation.

14. The disk drive suspension according to claim 13, in which said flexible conductive laminate extends the length of said load beam to a terminus, the metal layer of said flexible conductive laminate having a projecting portion extending beyond said laminate terminus, said metal layer projecting portion defining said suspension flexure.

15. The disk drive suspension according to claim 9, in which said load beam is etched to define a channel sized and shaped to receive said flexible conductive laminate plastic layer opposite said load beam.

16. The disk drive suspension according to claim 15, in which said flexible conductive laminate metal layer defines a tab extending outward from and generally in the plane of said metal layer, said tab attaching said metal layer to said load beam in mechanically supporting and electrically conducting relation.

17. The disk drive suspension according to claim 16, in which said flexible conductive metal layer defines a pair of opposed tabs on opposite sides of said metal layer, said tabs being formed commonly with said metal layer and having terminals by which said metal layer is attached to said load beam.

18. The disk drive suspension according to claim 17, in which said tab terminals are formed commonly with said metal layer and said tabs and extend in the plane of said metal layer.

19. The disk drive suspension according to claim 18, including also a visco-elastic material attached to said load beam in vibration damping relation.

20. The disk drive suspension according to claim 19, in which said flexible conductive laminate extends the length of said load beam to a terminus, the metal layer of said flexible conductive laminate having a projecting portion extending beyond said laminate terminus, said metal layer projecting portion defining said suspension flexure.

21. A disk drive suspension having increased protection against signal loss and mechanical damage and increased isolation from ambient electrical disturbances, said suspension comprising a metal load beam and a flexible conductive laminate comprising a metal layer laterally and longitudinally extended opposite said metal load beam and a plastic layer, said plastic layer comprising an insulating film having a plurality of conductive traces therein between said load beam and said metal layer, said plastic layer being sandwiched between said metal load beam and said conductive laminate metal layer in metal load beam and metal layer spacing relation, said conductive laminate metal layer being electrically conductively connected to said load beam, whereby said conductive traces are protected on two sides against signal loss and mechanical damage and have increased isolation from ambient electrical disturbances.

22. The disk drive suspension according to claim 21 in which said metal load beam and said plastic layer are substantially coextensive.

* * * * *